(No Model.)
H. A. BROGNARD.
MANUFACTURE OF CUTLERY, &c.
No. 368,060.  Patented Aug. 9, 1887.
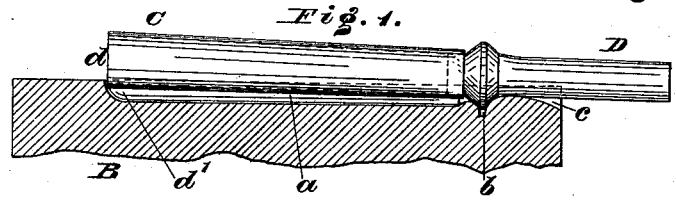
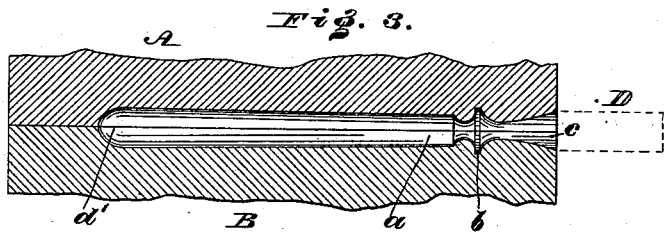
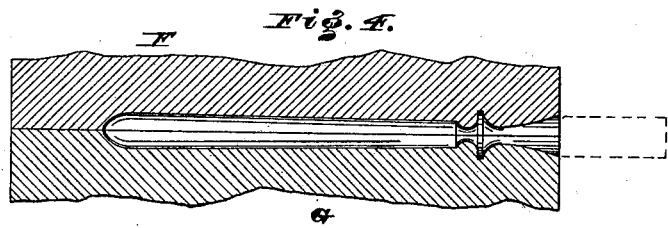
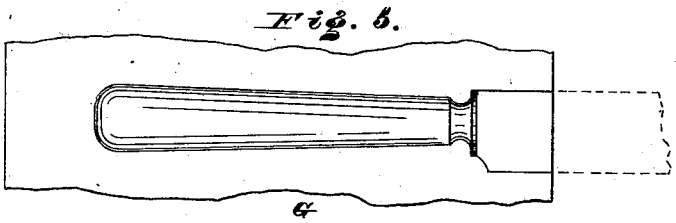
WITNESSES:
A. P. Grant,
L. Douville
INVENTOR:
Henry A. Brognard,
BY John A. Wiedersheim
ATTORNEY.
N. PETERS, Photo-Lithographer, Washington, D. C.

UNITED STATES PATENT OFFICE.

HENRY A. BROGNARD, OF PHILADELPHIA, PENNSYLVANIA.

MANUFACTURE OF CUTLERY, &c.

SPECIFICATION forming part of Letters Patent No. 368,060, dated August 9, 1887.

Application filed June 12, 1886. Serial No. 204,915. (No model.)

*To all whom it may concern:*

Be it known that I, HENRY A. BROGNARD, a citizen of the United States, residing in the city and county of Philadelphia, State of Pennsylvania, have invented a new and useful Improvement in the Manufacture of Cutlery, &c., which improvement is fully set forth in the following specification and accompanying drawings, in which—

Figure 1 represents a vertical section of one of the forming-dies employed in the manufacture of cutlery embodying my invention, including a side elevation of the tube and headpiece from which the cutlery is made. Fig. 2 represents a plan view of the said die, including the said tube and head-piece. Fig. 3 represents a vertical section of the upper and lower forming-dies. Fig. 4 represents a vertical section of the upper and lower welding or finishing dies embodying my invention. Fig. 5 represents a plan view of one of either of the forming or welding dies.

Similar letters of reference indicate corresponding parts in the several figures.

My invention relates to improvements in the manufacture of cutlery, tools, and other articles having hollow handles of iron or steel; and it consists of the combination of a pair or set of dies whereby a tube and a blade or headpiece are primarily formed into proper shape, and another pair or set of dies whereby the same are effectively welded.

Referring to the drawings, A and B represent the upper and lower dies of a pair of dies, the same having in their faces depressions $a$ $b$ $c$ approximating the contour of the handle of a knife and the bolster and adjacent portion of the blade thereof. The handle is formed of a tube, C, open at both ends, and a head-piece, D, the latter having a tang which is fitted in the adjacent end of said tube, as seen in Figs. 1 and 2, the tube being shorter than the length of the depression $a$, so that its heel end $d$ rests within the concave portion $d'$ of said depression. The tube and head-piece are heated to a dull red heat and placed on the lower die, B, the upper die then descending, whereby the tube and head-piece are struck, the effect of which is to close down the open end of the tube and turn the edges thereof toward each other, so as to meet or nearly meet, and also attach the blade or headpiece to the tube to avoid separation of the same during subsequent handling thereof.

F and G represent the upper and lower dies of a pair of welding-dies to which the blade and head-piece, as worked and connected, are subjected. The depressions of the forming-dies are approximately of the same width and shape as those of the welding-dies, but deeper than the latter in proportion to the size of the handle to be made—that is to say, when the forming-dies are placed together, the depressions are of a depth exceeding those of the welding-dies, but less than the outside diameter of the tube employed, and slightly longer than the welding-dies. As the open end of the tube does not quite reach to the end of the depression $a$ in the forming-dies, the extreme end of said tube when struck is not caught by the edge of the dies, whereby a flash or fin is avoided. Owing to the concave shape of the heel portion of the depression $a$, the edges of the ends of the tube are turned toward each other, so as to meet or nearly meet, as has been stated, and as the metal is not drawn away by the direct impact of the edges of the dies it is forced to fill up the full form of the depression. The sharp edges of the forming-dies may be rounded off from around that part of the dies where the width of the depression in the dies is less than the outside diameter of the tube, thus avoiding as much as possible the cutting away of the tube at the aforesaid place, which would occur if the sharp edges of the dies were not rounded off. After the tube and head-piece are removed from the forming-dies they are reheated to a welding heat and placed in the lower die of the welding or finishing dies, the upper die then descending, so that the tube and piece are again struck, thus effectively closing the end edges of the tube corresponding to the heel or butt of the handle and welding the same, as well as the side edges of the tube, in a reliable manner, producing a uniform, smooth, and perfectly-formed handle, which will not open or separate during subsequent manipulation or use.

Having thus described my invention, what I claim as new, and desire to secure by Letters Patent, is—

1. A set of dies for forming and welding hollow handles for cutlery, and welding the same to the stock for the blade, consisting of two pairs of dies, each of said dies having the depressions *a*, *b*, and *c*, corresponding to the handle-bolster and adjacent portion of the blade, the depression of the forming-dies being of greater depth and length than those of the welding-dies, substantially as described.

2. The method of manufacturing hollow-handle cutlery, consisting, first, in placing the assembled parts in dies having depressions with concave ends, the depressions being longer than the tube designed for the handle; second, simultaneously closing the heel end of the tube and partially uniting the blade portion and the other end of the tube, and, third, after reheating the partially-connected parts fully uniting the same by welding, substantially as described.

HENRY A. BROGNARD.

Witnesses:
JOHN A. WIEDERSHEIM,
A. P. GRANT.